United States Patent [19]
Zajic

[11] Patent Number: 4,861,095
[45] Date of Patent: Aug. 29, 1989

[54] FLOOR FOR CONDITIONED AIR VEHICLES

[75] Inventor: Albert H. Zajic, Oklahoma City, Okla.

[73] Assignee: American Trailers, Inc., Oklahoma City, Okla.

[21] Appl. No.: 130,292

[22] Filed: Dec. 8, 1987

[51] Int. Cl.⁴ ............................................. B61D 3/00
[52] U.S. Cl. .................................... 296/182; 52/588; 105/375
[58] Field of Search ............... 296/182, 39 A; 52/588 X, 732, 729, 579, 630, 177; 105/375 X

[56] References Cited

U.S. PATENT DOCUMENTS

| | | | |
|---|---|---|---|
| 1,271,413 | 7/1918 | Allen | 105/422 |
| 2,275,721 | 3/1942 | Bonsall | 62/17 |
| 2,753,018 | 7/1956 | Curell | 189/34 |
| 2,786,556 | 3/1957 | Constance, Jr. | 189/34 |
| 2,923,384 | 2/1960 | Black | 189/34 |
| 2,952,341 | 9/1960 | Weiler | 189/34 |
| 3,046,852 | 7/1962 | Graham | 94/30 |
| 3,075,802 | 1/1963 | Lowe | 296/29 |
| 3,110,371 | 11/1963 | De Ridder | 189/34 |
| 3,116,950 | 1/1964 | Chieger et al. | 296/24 |
| 3,128,851 | 4/1964 | Deridder et al. | 189/34 |
| 3,152,669 | 10/1964 | Johnston | 189/34 |
| 3,175,606 | 3/1965 | Talmey et al. | 165/41 |
| 3,229,438 | 1/1966 | Flagan | 52/588 |
| 3,246,592 | 4/1966 | Rath | 98/31 |
| 3,269,072 | 8/1966 | Black | 52/377 |
| 3,362,179 | 1/1968 | Kirkpatrick | 62/97 |
| 3,368,315 | 2/1968 | Thurnau | 52/588 |
| 3,416,280 | 12/1968 | Young | 52/588 |
| 3,440,780 | 4/1969 | Adam et al. | 52/169 |
| 3,555,762 | 1/1971 | Costanzo, Jr. | 52/588 |
| 3,792,595 | 2/1974 | Willis | 62/414 |
| 3,884,328 | 5/1975 | Williams | 182/222 |
| 3,986,310 | 10/1976 | van den Broek | 52/169 R |
| 4,091,743 | 5/1978 | Lemon | 105/375 |
| 4,143,588 | 3/1979 | Exler | 98/6 |
| 4,505,126 | 3/1985 | Jones et al. | 62/239 |
| 4,553,403 | 11/1985 | Taylor | 62/239 |
| 4,631,891 | 12/1986 | Donavich | 52/588 |

Primary Examiner—Robert R. Song
Attorney, Agent, or Firm—Laney, Dougherty, Hessin & Beavers

[57] ABSTRACT

A vehicular floor structure includes individual T-panels and duct panels, each including only its own respective type of structural members, interconnected to define distinct primary load bearing areas and primary air circulating areas.

8 Claims, 3 Drawing Sheets

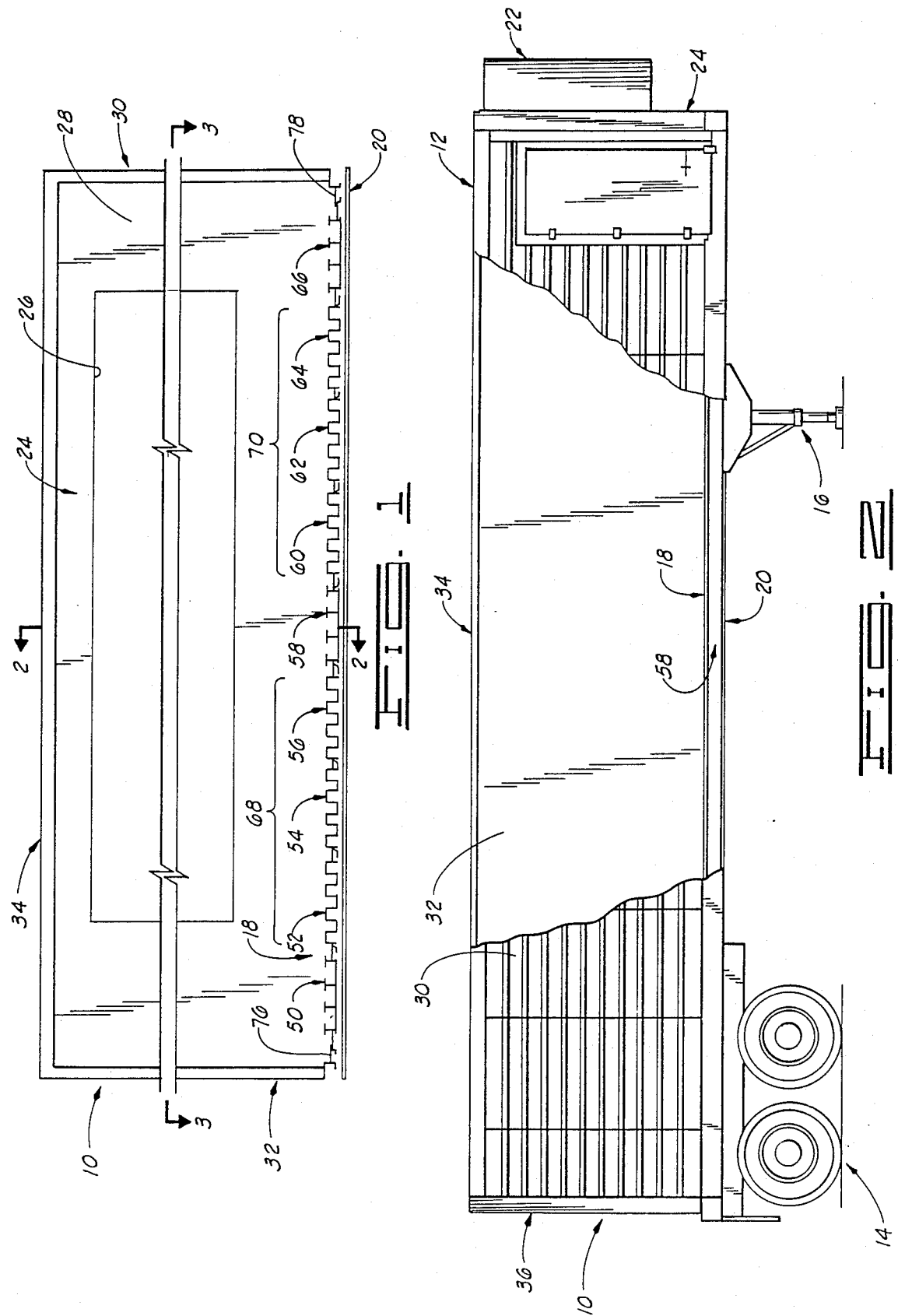

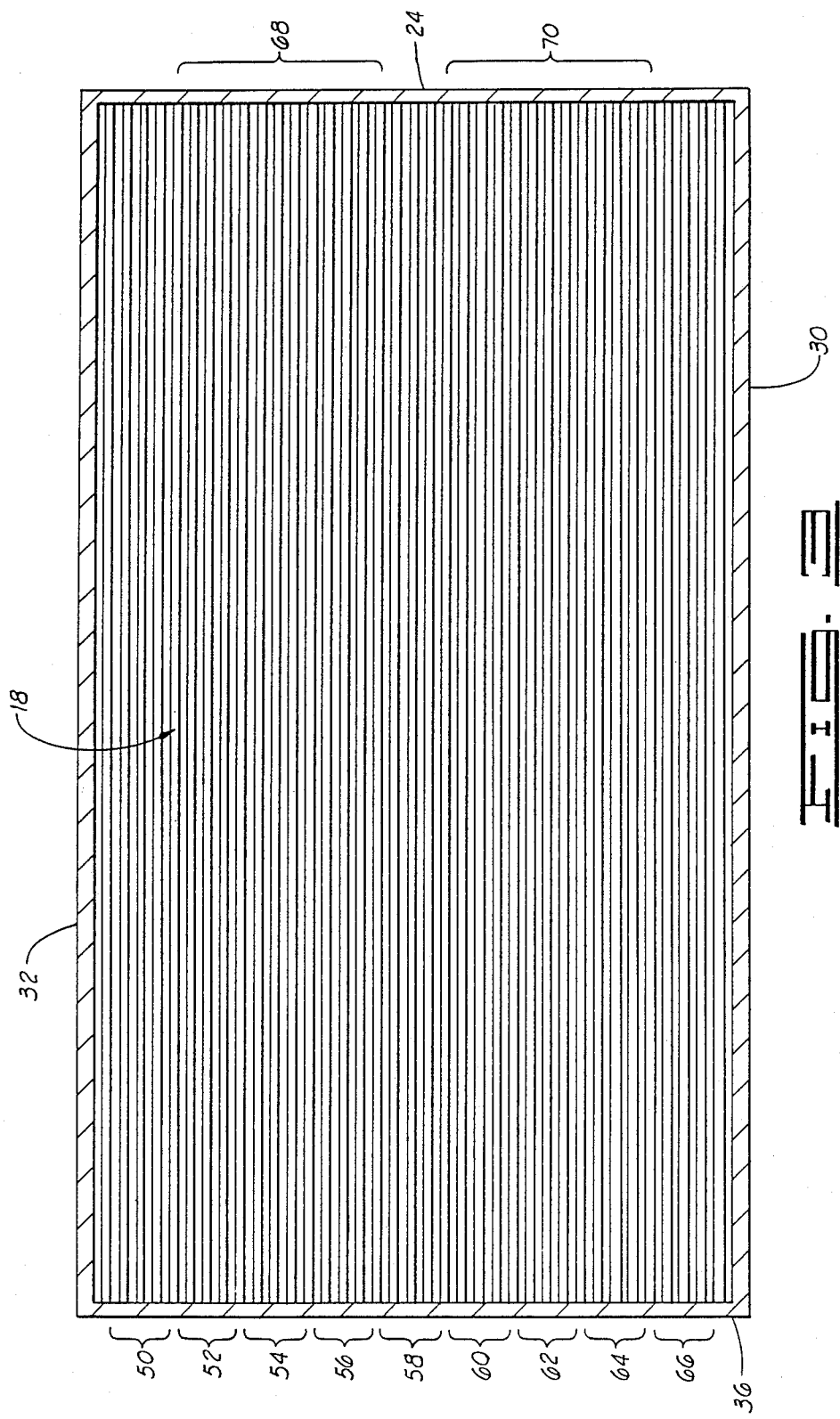

FLOOR FOR CONDITIONED AIR VEHICLES

BACKGROUND OF THE INVENTION

This invention relates generally to a floor structure for truck trailers, truck bodies, railway cars, and the like, and more particularly, but not by way of limitation, to a floor structure that combines both the benefits of high structural strength and enhanced air circulation.

Trucks, trailers, containers and railway cars utilized in the transportation of goods that require conditioned air, either heated or cooled, are constructed of an insulated enclosed compartment which is equipped with a mechanical unit that can supply heated or cooled air to this compartment. The distribution of this conditioned air about the cargo is of prime concern in maintaining the proper temperature for the goods while in transit. The conditioned air should be circulated over the top, around the sides and underneath the cargo. The cargo may rest directly on the floor, thereby preventing air circulation beneath the cargo unless the floor structure provides some means of air passage from front to rear.

One known floor structure is a corrugated extruded floor, commonly referred to as a "duct" floor. This floor type includes interconnecting panels made from extruded metals such as aluminum. The extrusions on these panels are a plurality of elongated, inverted U-shaped channels, equally and parallel-spaced. Spaces formed between the inverted U-shaped channels provide passage for air, and thus, circulate air along the floor. The amount of air passage is restricted by the size of the inverted U-shaped channels. the legs of the inverted U-shaped channels provide support for a horizontal, load-bearing surface that is connected to the upper edges of these supporting legs. This combination of the flat load-bearing surface and the supporting legs provides a high structural strength loading platform that can withstand high stresses such as can be imposed by forklift trucks or other means used to load cargo onto the floor. Since most cargos are loaded with some type of mechanical lift truck, the structural integrity of the floor is of prime importance. An example of a floor structure composed of duct panels is disclosed in U.S. Pat. No. 2,786,556 to Constance, Jr.

Another known type of floor structure is the "T-floor". This type of floor provides enhanced air circulation as well as a load-bearing surface. To obtain a greater amount of air passage space beneath the cargo this type of floor utilizes interconnected extruded metallic panels including a flat base from which a plurality of T-shaped members extend upward, with a horizontal flat area on which the cargo rests. A typical spacing between the T-shaped members provides a greater area for air circulation than in a typical duct panel. Examples of patents disclosing floor structures composed of T-panels are U.S. Pat. No. 3,368,315 to Thurnau; U.S. Pat. No. 2,923,384 to Black; and U.S. Pat. No. 2,952,341 to Weiler.

Although providing enhanced air circulation, the T-floors are relatively weak compared to duct floors. The design of T-floors, comprised of T-shaped members, with a single vertical leg supporting the horizontal surface and spaced apart with no connection between the horizontal surfaces can be damaged, collapsed or distorted by heavy cargos and high weight factor load stresses. To strengthen this type of floor, various devices and means have been attempted such as described in U.S. Patent No. 3,416,280 to Young, U.S. Pat. No. 3,128,851 to Deridder et al., and U.S. Patent 4,091,743 to Lemon. However, none of these overcomes the disadvantages of being more complex and expensive to manufacture than the simple T-shape or the U-shaped duct floor.

A disclosure to combine T-shapes and U-shapes into individual floor panels is made in U.S. Pat. No. 4,631,891 to Donavich. This patent discloses a floor structure made up of panels that have both T-shapes and U-shapes extruded onto each individual panel. The patent discloses, several different combinations of T-shapes and U-shapes on different panels.

Although this combination on individual panels could provide floors on which heavy cargo can be placed with good air circulation, there still exists the possibility of damage by forklift trucks which inadvertently tread onto the T-shaped elements. Such floors do not define definite areas upon which mechanical lift trucks can mount without the possibility of damaging T-shaped elements.

U.S. Pat. No. 2,753,018 to Curell discloses a panel assembly arrangement for floor structures. This patent disclosure proposes the use of two outer J-panels, a U-shaped center panel and a plurality of intermediate extruded metal panels.

Despite the foregoing disclosures there has existed a need for an integrated floor structure which can withstand the severe stresses of forklifts and other mechanical loading devices that are used in cargo transport and loading, but which still provides significant air circulation beneath the cargo. Thus, there is a need for a floor structure that defines aisles upon which heavy mechanical loaders may consistently bear down without the fear of crushing weaker, but greater air circulating, areas of the floor.

SUMMARY OF THE INVENTION

The present invention overcomes the above-noted and other shortcomings of the prior art by providing a novel and improved floor structure for vehicles used in the transport of insulated cargo.

The present invention offers the advantages of both the conventional completely T-shaped floor and the completely U-shaped floor by the construction and integrated placement of two different types of interconnecting floor panels into a single floor structure. The advantages of the present invention include providing increased structural strength at locations where higher stresses are expected from the use of, for example, wheeled loading devices and providing maximum air circulation in the areas which are not expected to be subject to the high stresses imposed by such loading devices.

Furthermore, by providing a definite and non-arbitrary pattern of panels that are exclusively of one type of extrusions to form a definite and non-arbitrary aisle for forklifts and other mechanical loading devices, this invention negates the necessity of undue precaution in avoiding weak areas of the floor. By providing a definite pathway for loaders, consistency and expedience are promoted in the cargo loading process.

Broadly, the present invention provides a vehicular floor structure that is comprised of at least one duct panel and at least one T-panel. The duct panel includes a plurality of elongated channels, and the T-panel includes a plurality of T-shaped elongated members. The panels are connected together so that the elongated channels of the duct panel define a primary weightbearing surface in the floor structure and the T-shaped elongated members define a primary air circulating portion in the same floor structure.

In a preferred embodiment, the present invention provides for a vehicular structure for transport of cargo. This vehicular structure comprises a wheeled trailer including four adjoined side walls and an adjoined roof that define a cargo receiving area. It further comprises a floor assembly that is disposed opposite the roof and adjacent the four side walls. The floor assembly comprises a plurality of duct panels and a plurality of T-panels interspersed among and interconnected to the plurality of duct panels. The vehicular structure also comprises mechanical means, mounted in at least one of the side walls or the roof, for supplying conditioned air into the cargo receiving compartment so that the conditioned air circulates through the interspersed, interconnected duct panels and T-panels.

Therefore, from the foregoing, it is a general object of the present invention to provide a novel and improved vehicular floor structure for the transport of insulated cargo. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 1 is a schematic end sectional view of one embodiment of the present invention illustrating the end views of the duct panels and the T-panels arranged in the floor structure of the present invention.

FIG. 2 is a schematic side view in partial cutaway, as viewed from the embodiment shown in FIG. 1 along line 2—2 in FIG. 1.

FIG. 3 is a plan view of the floor structure as viewed along line 3—3 in FIG. 1.

DETAILED DESCRIPTION OF THE PREFERRED EMBODIMENT

Figure 4:
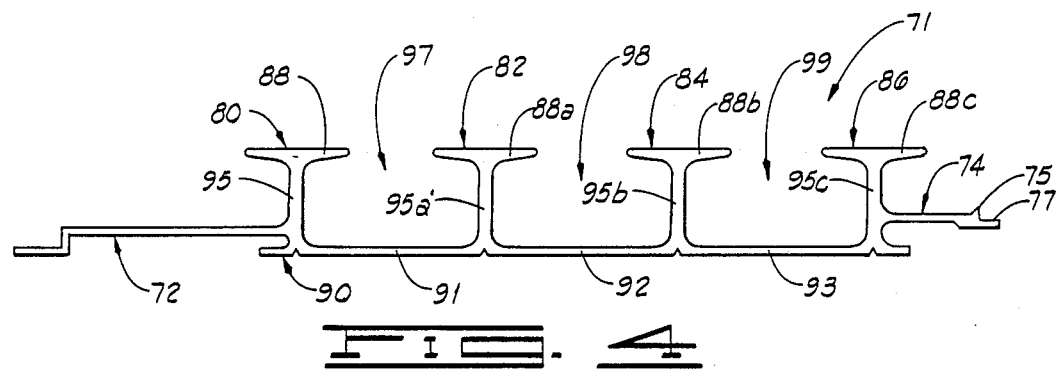
FIG. 4 is an end view of an end T-panel that is part of the illustrated preferred embodiment floor structure of the present invention.

With reference to the drawings, the preferred embodiment of the present invention will be described. A vehicular structure 10 for transport of cargo constructed in accordance with the preferred embodiment is generally depicted in FIG. 2. The structure 10 includes a conventional truck trailer 12 mounted on wheels 14 and supported near its forward end by a support 16. Within the trailer 12, a floor structure 18 is mounted on a base or bed or under support structure 20 of the trailer 12. Although mounting on the bed of a trailer is one of the preferred embodiments of the floor structure 18, there are other contemplated applications for the floor structure such as in railway cars, truck bodies, etc. FIG. 2 further shows that the vehicular structure 10 includes conventional mechanical means 22 for supplying conditioned (heated or cooled) air into the interior cargo receiving compartment of the trailer 12. The mechanical means 22 is mounted to a front side wall 24 of the trailer 12 as illustrated in FIG. 2. Mechanical means 22 communicates through the outer surface of the front side wall 24 to an inner surface 28 by way of an aperture 26 (see FIG. 1). Adjoining the front side wall 24 are side walls 30, 32 and a roof 34. A rear side wall 36 adjoins the ends of the side walls 30, 32 opposite the front side wall 24. The cargo receiving compartment is defined by these adjoined side walls and roof. Each of the side walls and roof is constructed in the preferred embodiment in a conventional manner, such as including inner and outer structural sheets between which insulation is disposed.

The floor structure 18 is mounted laterally across the trailer 12 between the side walls 30 and 32 and longitudinally along the trailer 12 between the side walls 24, 36. It is, of course, disposed opposite the roof 34. The preferred embodiment of the floor structure 18 shown in FIG. 1 includes nine discrete panels: a T-panel 50 which is at one outermost side portion of the floor structure; three duct panels 52, 54, 56; a T-panel 58, which is situated in the center of the floor structure 18; three duct panels 60, 62 and 64; and a T-panel 66, which is at the other outermost side portion of the floor structure opposite the T-panel 50. T-panel 50 is connected directly to duct panel 52; T-panel 50 is also connected adjacent the side wall 32. Duct panel 52 is connected directly to duct panel 54. Duct panel 54 is connected directly to duct panel 56. T-panel 58 is connected directly between and to duct panel 56 and to duct panel 60. Duct panel 60 is directly connected to duct panel 62. Duct panel 62 is directly connected to duct panel 64. Duct panel 64 is directly connected to T-panel 66, which T-panel 66 is connected adjacent the side wall 30.

The T-panels 50, 58 and 66 define primary air circulating portions of the floor structure 18; however, the T-panels 50, 58 and 66 also have some weight bearing capability. That is, the Tpanels 50, 58 and 66 function as, and can be constructed as, conventional T-panels. Similarly, the duct panels 52, 54, 56, 60, 62 and 64 can be of conventional types in that each primarily provides weight bearing surfaces but also provides some degree of air circulation capacity. Thus, it is not a particular panel construction that is unique to the present invention; rather, the integration of different types of panels into a floor structure yielding enhanced overall characteristics.

More particularly, in the present invention the duct panels 52, 54 and 56 are interconnected together and collectively positioned within the overall floor structure to provide a high strength aisle 68 upon which the wheels of a forklift or any other wheeled or heavy cargo loading device may be driven onto or placed. Similarly, the duct panels 60, 62 and 64 complement the duct panels 52, 54 and 56 by defining an aisle 70 on the other side of the middle T-panel 58. The two aisles 68 and 70 thus provide weight bearing surfaces suitable for supporting at least respective portions of a mechanical cargo loading transport vehicle such as a forklift. This provides an overall consistent and safe loading/unloading pathway without fear of damage to the relatively weaker T-panels 50, 58 and 66 which are specifically located out of the aisles 68, 70. The T-panels 50, 58 and 66, however, are important to the overall floor structure 18 because they provide primary enhanced air circulation paths beneath the cargo loaded on them.

As generally shown in FIGS. 1 and 3, each of the T-panels 50, 58 and 66 includes a plurality of elongated, parallel, equally laterally spaced T-shaped elements extending the full length of each panel. Each of the duct panels 52, 54, 56, 60, 62 and 64 includes a plurality of parallel U-shaped channels that are elongated longitudinally along the entire length of the panel and equally spaced along the width of the panel. Each panel, whether of the T-type or duct-type, includes exclusively that respective type of structural element. In the preferred embodiment each panel is an extruded metal panel fabricated in a manner as known to the art; however, it is contemplated that any suitable material and construction can be used.

With respect to the illustrated preferred embodiment, however, FIG. 4 shows a particular type of end T-panel 71 suitable for use as either of the T-panels 50 or 66 schematically depicted in FIGS. 1 and 3. The end T-panel 71 is mechanically locked onto the adjacent side wall (either side 30 or 32 in FIG. 1) by a mechanical interlocking end 72 shown in FIG. 4. The interlocking end 72 is planar but for a stepped outer edge; this design fits under a conventional retaining structure 76 extending along the bottom of the side wall 32 or under a conventional retaining structure 78 extending along the bottom of the side wall 30. The locking end 72 extends laterally from a T-shaped elongated member 80 integrally extending above a planar base 90 from which other T-shaped elongated members 82, 84 and 86 extend parallel to the member 80. Separating the T-shaped members 80, 82, 84 and 86 are horizontal sections or members 91, 92, 93.

The T-shaped elongated member 80 includes an elongated, flat surfaced horizontal member 88 integrally connected atop a vertically rising, elongated portion or leg 95. The T-shaped elongated members 82, 84 and 86 have, likewise, corresponding horizontal members 88a, 88b and 88c, and vertically rising elongated portions 95a, 95b and 95c. The aligned flat surfaces 88, 88a, 88b and 88c are load-bearing surfaces, but the design of the T-panel 71 is primarily for enhanced air circulation in floor structure 18 through air circulating spaces or channels 97, 98, 99 defined between the T-shaped elongated members 80, 82, 84 and 86. These channels are outwardly defined by the T-shaped members 80 and 86 and are inwardly defined by the T-shaped members 82 and 84.

Extending horizontally from the vertical leg 95c of the T-shaped member 86 is an interlocking end 74 having a vertically extending tip 75 and notch 77. The tip 75 and notch 77 are designed to receive and interconnect with a mating structure extending from the directly connected adjacent duct panel. These interconnected ends can be welded or sealed by any suitable joining means. The ends thus joined provide a watertight seal whereby residual liquids cannot filter down onto the trailer bed or otherwise below the undersides of the panels.

Figure 6:
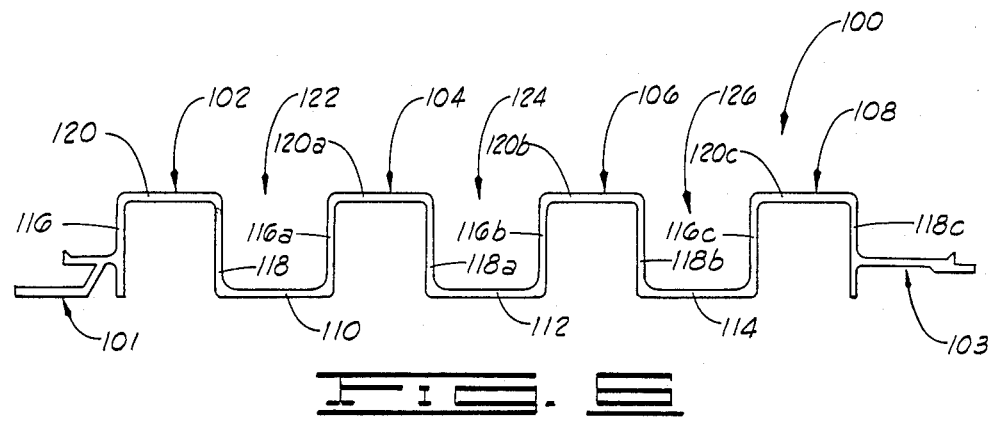
FIG. 6 is an end view of a duct panel that is part of the illustrated preferred embodiment floor structure of the present invention.

FIG. 6 shows the preferred embodiment duct panel used for the panels 52, 54, 56, 60, 62 and 64 schematically depicted in FIGS. 1 and 3. The entire panel, here identified by the reference number 100, is molded or extruded as a single piece from a suitable metal such as aluminum; however, the panel 100 can also be made in any other suitable manner from any other suitable material. The duct panel 100 includes two mechanically interlocking ends 101 and 103 disposed on the two outermost ends of the duct panel so that they extend laterally beyond four downwardly opening, inverted U-shaped members 102, 104, 106 and 108 which are spaced by horizontal members 110, 112 and 114. The end 103 has the same configuration as the end 74 shown in FIG. 4, and the end 101 has the configuration shown in FIG. 6 by which to establish a watertight interlocked joint with a respective end 74 or 103 depending upon which panels are connected.

Inverted, downwardly opening, U-shaped member 102 includes a vertical elongated leg 116, a vertical elongated leg 118, and a connecting horizontal member 120 extending between the upper edges of the vertical channel side wall defining legs 116 and 118. This structure provides a high strength primary weight bearing portion. Inverted, downwardly opening, U-shaped members 104, 106 and 108 have corresponding vertical elongated legs 116a and 118a, 116b and 118b, and 116c and 118c and upper edge connecting horizontal members 120a, 120b, and 120c, respectively, which perform similar functions as in the U-shaped member 102.

Inverted, downwardly opening U-shaped members 102 and 104 and the horizontal member 110 extending between the lower edges of the legs 118 and 116a thereof define an upwardly opening channel 122 therebetween. Inverted, downwardly opening U-shaped members 104 and 106 and the horizontal member 112 extending between the lower edges of the legs 118a and 116b thereof define an upwardly opening channel 124 therebetween. Inverted, downwardly opening U-shaped members 106 and 108 and the horizontal member 114 extending between the lower edges of the legs 118b and 116c thereof define an upwardly opening channel 126 therebetween. The three channels 122, 124 and 126 provide air channels that allow air circulation under cargo that is placed on the horizontal surface defined by the members 120, 120a, 120b and 120c.

Figure 5:
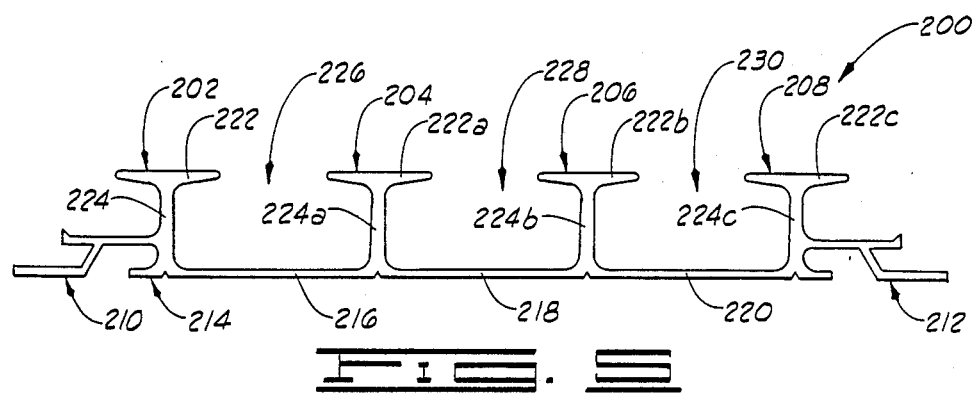
FIG. 5 is an end view of a middle T-panel that is part of the illustrated preferred embodiment floor structure of the present invention.

FIG. 5 shows the preferred embodiment of the middle T-panel 58 schematically depicted in FIG. 1. The particular embodiment of this panel is marked with the reference number 200 in FIG. 5. Like the end T-panel 71 in FIG. 4 and the duct panel 100 in FIG. 6, the T-panel 200 can be molded or extruded from a metal such as aluminum but it can also be fabricated in any other suitable manner from any other suitable material. as in the end T-panel 71, the middle T-panel 200 includes four T-shaped elongated members, these being identified in FIG. 5 by the reference numerals 202, 204, 206 and 208. The difference between the end T-panel 71 and the middle T-panel 200 is that the end T-panel 71 as shown in FIG. 4 has the interlocking means 72 which is designed to engage adjacent the side walls and the interlocking means 74 which is designed to snap together with other panels, whereas the middle T-panel 200 in FIG. 5 has two identical interlocking means 210 and 212 of similar design to the interlocking means 101 of the duct panel 100 shown in FIG. 6. The interlocking end 210 interlocks with the interlocking end 103 of the panel 56 and the interlocking end 212 interlocks with the interlocking end 103 of the panel 60, both sets of interlocked ends establishing watertight connections as with the interlocked ends of the other panels.

The T-shaped elongated members 202, 204, 206 and 208 are connected at their lower ends to a base 214. The base 214 includes horizontal sections or members 216, 218 and 220. The T-shaped elongated member 202 includes an elongated, flat surfaced horizontal member 222 integrally connected atop a vertically rising, elongated portion or leg 224. The T-shaped elongated members 204, 206 and 208 have corresponding elongated, flat surfaced horizontal members 222a, 222b and 222c, respectively, and vertically rising elongated portions or legs 224a, 224b and 224c, respectively. Although the flat surfaces of the horizontal members 222, 222a, 222b and 222c can bear loads and cargo weights, the primary function of the T-panel 200 is to provide air circulation in floor structure 18 through air channeling portions defined between the T-shaped members 202, 204, 206 and 208. A channel 226 is defined by the T-shaped members 202 and 204 and the horizontal section 216; a channel 228 is defined by the T-shaped members 204 and 206 and the horizontal section 218; and, a channel 230 is defined by the T-shaped members 206 and 208 and the horizontal section 220.

Although the preferred embodiment is shown as the particular combination of nine panels, it is contemplated that other numbers and combinations of T-panels and duct panels can be used. That is, in general, the present invention provides a vehicular floor structure which includes individual T-panels and duct panels, each including only its own respective type of structural members, interconnected to define distinct primary load bearing areas and primary air circulating areas.

Thus, the present invention is well adapted to carry out the objects and attain the ends and advantages mentioned above as well as those inherent therein. While a preferred embodiment of the invention has been described for the purpose of this disclosure, changes in the construction and arrangement of parts can be made by those skilled in the art, which changes are encompassed within the spirit of this invention as defined by the appended claims.

What is claimed is:

1. A vehicular floor structure, comprising:
    a first T-panel defining a first outermost portion of said floor structure;
    a first duct panel connected directly to said first T-panel;
    a second duct panel connected directly to said first duct panel;
    a third duct panel connected directly to said second duct panel;
    a second T-panel connected directly to said third duct panel;
    a fourth duct panel connected directly to said second T-panel;
    a fifth duct panel connected directly to said fourth duct panel;
    a sixth duct panel connected directly to said fifth duct panel; and
    a third T-panel, connected directly to said sixth duct panel, defining a second outermost portion of said floor structure.

2. The floor structure of claim 1, wherein at least one of said duct panels comprises:
    a first elongated leg defining a first outermost duct side wall portion of said at least one duct panel, said first elongated leg having an upper edge;
    a second elongated leg having an upper edge and a lower edge;
    a first horizontal member connected between said upper edge of said first elongated leg and said upper edge of said second elongated leg;
    a third elongated leg having an upper edge and a lower edge;
    a second horizontal member connected between said lower edge of said second elongated leg and said lower edge of said third elongated leg;
    a fourth elongated leg having an upper edge and a lower edge;
    a third horizontal member connected between said upper edge of said third elongated leg and said upper edge of said fourth elongated leg;
    a fifth elongated leg having an upper edge and a lower edge;
    a fourth horizontal member connected between said lower edge of said fourth elongated leg and said lower edge of said fifth elongated leg;
    a sixth elongated leg having an upper edge and a lower edge;
    a fifth horizontal member connected between said upper edge of said fifth elongated leg and said upper edge of said sixth elongated leg;
    a seventh elongated leg having an upper edge and a lower edge;
    a sixth horizontal member connected between said lower edge of said sixth elongated leg and said lower edge of said seventh elongated leg;
    an eighth elongated leg having an upper edge, said eighth elongated leg defining a second outermost duct side wall portion of said at least one panel; and
    a seventh horizontal member connected between said upper edge of said seventh elongated leg and said upper edge of said eighth elongated leg.

3. The floor structure of claim 1, wherein at least one of said T-panels includes:
    a first vertically rising, T-shaped, elongated member defining a first outward air channeling portion of said at least one T-panel, said first vertically rising, T-shaped, elongated member having a lower end;
    a second vertically rising, T-shaped, elongated member having a lower end;
    a first horizontal member connected between said lower end of said first vertically rising, T-shaped, elongated member and said lower end of said second vertically rising, T-shaped, elongated member;
    a third vertically rising, T-shaped, elongated member having a lower end;
    a second horizontal member connected between said lower end of said second vertically rising, T-shaped, elongated member and said lower end of said third vertically rising, t-shaped, elongated member;
    a fourth vertically rising, T-shaped, elongated member having a lower end, said fourth vertically rising, T-shaped, elongated member defining a second outward air channeling portion of said at least one T-panel; and
    a third horizontal member connected between said lower end of said third vertically rising, T-shaped, elongated member and said lower end of said fourth vertically rising, T-shaped, elongated member.

4. The floor structure of claim 1, wherein:
    said first, second and third duct panels define a first aisle including a first weight-bearing surface for supporting at least part of a cargo loading transport vehicle; and
    said fourth, fifth and sixth duct panels define a second aisle including a second weight-bearing surface for supporting at least part of a cargo loading transport vehicle.

5. The floor structure of claim 4, wherein:
    said first T-panel defines a first primary air circulation channel member;
    said second T-panel defines a second primary air circulation channel member; and said third T-panel defines a third primary air circulation channel member.

6. A vehicular structure for transport of cargo, comprising:
- a wheeled trailer, including four adjoined side walls and an adjoined roof defining a cargo receiving compartment;
- a floor assembly disposed in said trailer adjacent said side walls and opposite said roof, said floor assembly comprising:
- a plurality of duct panels; and
- a plurality of T-panels interspersed among and interconnected to said plurality of duct panels;
- mechanical means, mounted in at least one of said side walls or said roof, for supplying conditioned air into said cargo receiving compartment so that said conditioned air circulates through said interspersed, interconnected duct panels and T-panels; and wherein:
said plurality of duct panels include:
- a first duct panel including a plurality of parallel U-shaped channels;
- a second duct panel connected directly to said first duct panel, said second duct panel including a plurality of parallel Ushaped channels;
- a third duct panel connected directly to said second duct panel, said third duct panel including a plurality of parallel Ushaped channels;
- a fourth duct panel including a plurality of parallel U-shaped channels;
- a fifth duct panel connected directly to said fourth duct panel, said fifth duct panel including a plurality of parallel Ushaped channels; and
- a sixth duct panel connected directly to said fifth duct panel, said sixth duct panel including a plurality of parallel Ushaped channels; and said plurality of T-panels includes:
- a first T-panel disposed adjacent a first one of said side walls and connected directly to said first duct panel, said first Tpanel including a plurality of parallel T-shaped elongated members;
- a second T-panel connected directly between and to said third duct panel and said fourth duct panel, said second T-panel including a plurality of parallel Tshaped elongated members; and
- a third T-panel connected directly to said sixth duct panel and disposed adjacent a second one of said side walls, said third T-panel including a plurality of parallel T-shaped elongated members.

7. A vehicular floor structure, comprising:
- a first T-panel defining a first outermost portion of said floor structure;
- first duct panel means for defining a first aisle including a first weight-bearing surface for supporting at least part of a cargo loading transport vehicle, said first duct panel means connected directly to said first T-panel;
- a second T-panel connected directly to said first duct panel means;
- second duct panel means for defining a second aisle including a second weight-bearing surface for supporting at least part of a cargo loading transport vehicle, said second duct panel means connected directly to said second T-panel; and
- a third T-panel, connected directly to said second duct panel means, defining a second outermost portion of said floor structure.

8. The vehicular floor structure of claim 7, wherein:
said first T-panel defines a first primary air circulation channel member;
said second T-panel defines a second primary air circulation channel member; and
said third T-panel defines a third primary air circulation channel member.

* * * * *